(12) United States Patent  
Nichols et al.

(10) Patent No.: US 7,877,844 B2
(45) Date of Patent: Feb. 1, 2011

(54) TAG ATTACHMENT APPARATUS

(75) Inventors: Alice M. Nichols, Providence, RI (US); Khipra J. Nichols, Rumford, RI (US); Mark Sousa, Hope, RI (US)

(73) Assignee: UP Country, Inc., East Providence, RI (US)

( * ) Notice: Subject to any disclaimer, the term of this patent is extended or adjusted under 35 U.S.C. 154(b) by 626 days.

(21) Appl. No.: 11/977,934

(22) Filed: Oct. 25, 2007

(65) Prior Publication Data

US 2009/0107420 A1  Apr. 30, 2009

(51) Int. Cl.
  *A44B 15/00*  (2006.01)
  *A01K 27/00*  (2006.01)
(52) U.S. Cl. ............... 24/3.11; 24/3.6; 24/3.12; 24/343; 24/349; 70/459; 119/858
(58) Field of Classification Search ........... None
   See application file for complete search history.

(56) References Cited

U.S. PATENT DOCUMENTS

| | | | |
|---|---|---|---|
| 2,648,150 A | 8/1953 | Sullivan | |
| 4,137,660 A | 2/1979 | Dettmann et al. | |
| 4,178,879 A | 12/1979 | Cunningham | |
| 4,259,798 A | 4/1981 | McConnell | |
| 4,680,882 A | 7/1987 | Watson, Jr. | |
| 4,739,566 A | 4/1988 | Smith | |
| 5,467,743 A | 11/1995 | Doose | |
| 5,865,148 A | 2/1999 | Aguirre et al. | |
| 5,983,686 A * | 11/1999 | Lee | 70/456 R |
| D422,757 S | 4/2000 | Levine | |
| D448,273 S | 9/2001 | Lai | |
| 6,305,329 B1 | 10/2001 | Levy, Jr. | |
| 6,367,426 B1 | 4/2002 | Schaible | |
| 6,467,134 B1 | 10/2002 | Stroud | |
| D490,113 S | 5/2004 | Nykoluk | |
| 6,735,894 B2 | 5/2004 | Crusenberry et al. | |
| D516,126 S | 2/2006 | Schantz | |
| 7,021,247 B1 | 4/2006 | Seeno et al. | |
| 7,168,394 B2 | 1/2007 | Berry | |
| 7,225,761 B2 | 6/2007 | Reilly | |
| 2005/0268864 A1 * | 12/2005 | Gallagher et al. | 119/858 |

OTHER PUBLICATIONS

Advertisement, "Tag and Collar Clips," downloaded from http://www.jazzytags.com/clips.html, Sep. 12, 2007.
Advertisement, "The Tag-It Removeable Pet tag Holder—Black," downloaded from http://www.bigpawdesigns.com/tapettagho.html, Sep. 12, 2007.
Advertisement, "Patterns," downloaded from http://www.douglaspaquette.com, Apr. 2, 2007.

* cited by examiner

*Primary Examiner*—Jack W. Lavinder
(74) *Attorney, Agent, or Firm*—K&L Gates LLP

(57) ABSTRACT

An apparatus for attaching a tag to an object. The apparatus may include a body. The apparatus may also include an attachment arm, the attachment arm having a locked position and an unlocked position, and the attachment arm lockably closing to form a first closed loop with the body when the attachment arm is in the locked position. The apparatus may also include a tag loop mechanically coupled to the body. The apparatus may also include a detent arm mechanically engaged with the attachment arm in the locked position of the attachment arm, the detent arm configured so that an application of a force to the detent arm simultaneously unlocks the attachment arm and opens the tag loop.

24 Claims, 5 Drawing Sheets

TAG ATTACHMENT APPARATUS

FIELD OF THE INVENTION

The present invention relates generally to an attachment apparatus, for example an apparatus configured to attach a tag, such as a pet tag, to an object, such as a dog collar.

BACKGROUND

Pets are required to have identification and/or license tags in many jurisdictions. These tags are typically flat engraved metal plates with an aperture facilitating the attachment of the tag to a metal ring, although other forms and variants of such tags are also in use. Depending on the jurisdiction, several tags may be required to reflect licensing, ownership, and vaccination status of a pet. Owners may also add additional tags with information facilitating contacting the owner if a pet strays or is lost, or including other personally chosen information.

Over the years, pet collars have evolved away from being a purely functional item, e.g., a purely utilitarian object for leashing or restraining a pet into a fashion item. A pet owner may now have, instead of only one dog collar, several pet collars of different colors and/or styles to match the outfit of the pet owner, reflect a seasonal theme, or suit the owner's mood or whim on any particular day. A leading manufacturer of such fashion collars is Up Country, Inc., of East Providence, R.I., assignee of the present application.

Changing pet tags between multiple collars is time-consuming and may be difficult for some pet owners. Removing the tags from a collar (or adding the tags to a collar) while the collar is worn by an active or uncooperative pet may also present additional difficulties.

Conventional pet tag holders receive pet tags and attach to pet collars in a relatively complicated or difficult to perform fashion. Some of these pet tag holders require that the pet collar be removed from the pet first, so that the tag can be slid onto a metal split D- or O-ring attached to pet collar, etc. Other pet tag holders attach by a nut-and-bolt connection, and still others require that a hole or holes be punched into the pet collar. The manner of mounting a pet tag to the pet tag holder is not always straightforward.

DETAILED DESCRIPTION OF EXAMPLE EMBODIMENTS

Figure 1:
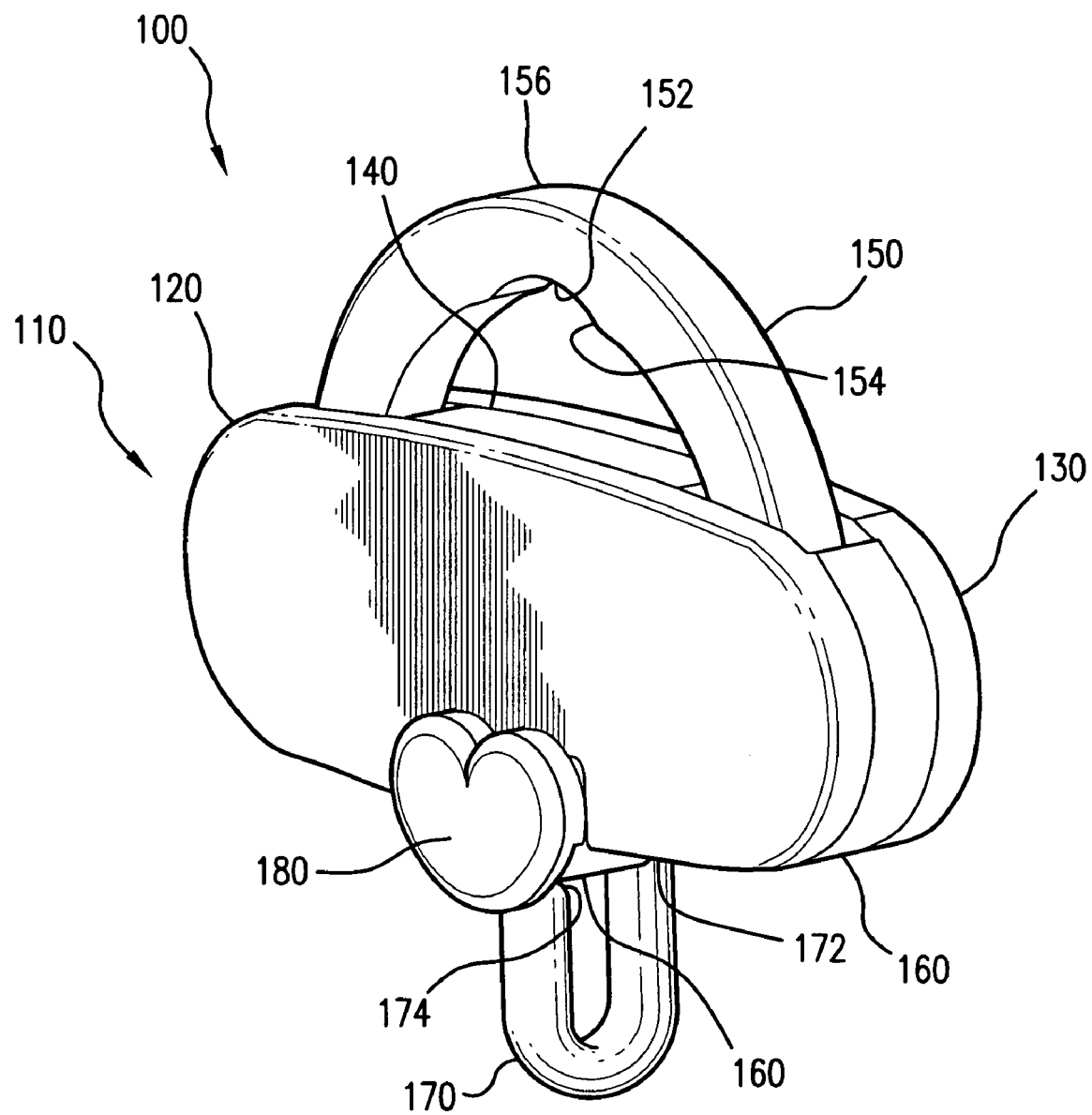
FIG. 1 is a perspective view of an example tag attachment apparatus, according to an example embodiment of the present invention.

Particularly in the case of a pet owner who has multiple collars for his or her pet or simply wants to be able to mount the pet tags and/or the pet tag holder in an uncomplicated manner, the inventors of the present application believe there is a need for a pet tag holder that receives pet tags and mounts to a pet collar quickly and easily, while still securely holding the tags to the pet collar.

Some example embodiments of the present invention include an apparatus, such as a pet tag holder, for attaching a tag to an object, such as a pet collar, in a quick, easy and reliable manner. In some example embodiments of the present invention, a single release mechanism, such as a sliding button operable with one hand, may be used to both release the attachment apparatus from the collar, or to allow the tag to be removed from the attachment apparatus. At the same time, the attachment apparatus may be designed to securely maintain attachment of the tag to the collar when the release mechanism is not manipulated.

In some example embodiments, the attachment apparatus may include a body to hold the parts of the apparatus together, an attachment arm for attaching the apparatus to an object such as a pet collar, a tag loop to attach a tag such as a pet tag to the apparatus, a detent arm to lock the attachment arm in place and to close the tag loop, an actuator to move the detent arm between a closed position and an open position of the actuator, and a compressible spring for exerting a force on the detent arm and retaining it in a closed position of the actuator when the detent arm is in an unactuated state.

One example embodiment of the present invention is a pet tag holder. The pet tag holder may include a pet collar attachment arm rotatable about a first axis, the pet collar attachment arm having a locked position and an unlocked position; a detent arm including an actuating arm and a lower seating recess, the detent arm being rotatable about a second axis approximately parallel to the first axis and engaging with the pet collar attachment arm when the pet collar attachment arm is in the locked position; an actuator mechanically coupled to the actuating arm, the actuator movable between an open position and a closed position; a front plate having a retention element; a rear plate having an upper seating element, the pet collar attachment arm forming a first closed loop with the front and rear plates in the locked position; a tag loop rigidly coupled to the rear plate at one end of the tag loop and forming a second closed loop with the detent arm when the actuator is in the closed position; and a compressible spring supported in a prestressed manner between the upper seating element of the rear plate and the lower seating recess of the detent arm. Moving the actuator from the closed position to the open position causes the detent arm to disengage from and unlock the collar attachment arm and simultaneously open the tag loop.

A second example embodiment of the present invention is an apparatus for attaching a tag to an object. The apparatus include a body; an attachment arm, the attachment arm having a locked position and an unlocked position, and the attachment arm lockably closing to form a first closed loop with the body when the attachment arm is in the locked position; a tag loop mechanically coupled to the body; and a detent arm mechanically engaged with the attachment arm in the locked position of the attachment arm, the detent arm configured so that an application of a force to the detent arm simultaneously unlocks the attachment arm and opens the tag loop.

A third example embodiment of the present invention is an apparatus for attaching a tag to an object. The apparatus include a body; an attachment arm, the attachment arm having a locked position and an unlocked position, and the attachment arm lockably closing to form a first closed loop with the body when the attachment arm is in the locked position; a tag loop mechanically coupled to the body; a detent arm mechanically engaged with the attachment arm in the locked position of the attachment arm, the detent arm configured so that an application of a force to the detent arm simultaneously unlocks the attachment arm and opens the tag loop, the detent arm including an actuating arm and a lower seating recess; an attachment arm bearing and a detent arm bearing, the attachment arm being rotatable on the attachment arm bearing about a first axis, and the detent arm being rotatable on the detent arm bearing about a second axis approximately parallel to the first axis; a compressible spring mechanically connected to the detent arm and resisting rotation of the detent arm about the second axis; and an actuator mechanically coupled to the actuating arm and having an open position and a closed position. The body includes a front plate and a rear plate, the attachment arm and the detent arm being situated at least partially between the front plate and the rear plate; the attachment arm and the detent arm are rotatable in approximately the same plane; the compressible spring is an annular spring, a z-shaped spring, or a zigzag-shaped spring; the detent arm, the attachment arm and the compressible spring are situated at least partially between the front plate and the rear plate; the tag loop is rigidly coupled to the rear plate at one end of the tag loop and forms a second closed loop with the detent arm when the actuator is in the closed position; the attachment arm includes a c-shaped engagement recess, the detent arm includes an engagement protuberance; the engagement protuberance engages with the c-shaped engagement recess when the actuator is in the closed position and the attachment arm is in the locked position; when the actuator is in the closed position, the compressible spring exerts a force on the detent arm to retain the detent arm in the closed position of the actuator; when the actuator is moved into the open position, a first portion of the detent arm including the engagement protuberance is rotated in a direction away from the attachment arm, the engagement protuberance disengages from the c-shaped engagement recess of the attachment arm, and a second portion of the detent arm including the actuating arm is rotated away from a second end of the tag loop to form a first open loop; when the actuator is moved into the open position and the attachment arm is in the locked position, a portion of the attachment arm including the c-shaped engagement recess may be rotated in a direction away from the detent arm into an unlocked position of the attachment arm to form a second open loop; the portion of the attachment arm including the c-shaped engagement recess includes a cam surface; when the actuator is in the closed position and the attachment arm is rotated from the unlocked position to the locked position, the cam surface exerts a force on the engagement protuberance and causes the detent arm to rotate until the engagement protuberance engages with the c-shaped engagement recess; and the attachment arm has a curved recess on an underside of the attachment arm, near a vertex of the attachment arm, the curved recess having a radius of curvature less than a radius of curvature of a portion of the attachment arm not including the recess.

A fourth example embodiment of the present invention is an assembly. The assembly include a pet tag having an aperture; the apparatus of the second example embodiment, the tag loop being inserted through the aperture; and a pet collar mechanically coupled to the apparatus by the attachment arm. The mechanical coupling of the pet collar to the apparatus is implemented via a ring through which the attachment arm is inserted, the pet collar passing through the ring.

Other features and aspects of the present invention will become more fully apparent from the following detailed description of some example embodiments, the appended claims and the accompanying drawings.

FIG. 1 is a perspective view of an example tag attachment apparatus, according to an example embodiment of the present invention. The example tag attachment apparatus 100 may include a body 110. The body may hold various parts of the apparatus 100 in place. The body 110 may include a front plate 120 and a rear plate 130, as well as an upper seating element 140. The example tag attachment apparatus 100 may further include an attachment arm 150, which may be configured to attach the apparatus 100 to an object such as a pet collar. The attachment arm 150 may have an overall shape of an arch, as shown in FIG. 1, but may, alternatively, have any shape allowing the arm to form a first closed loop with the body 150 of the apparatus 100, such as semicircular loop, triangular loop, rectangular loop, etc. The attachment arm 150 may also include a recess 152 on an underside 154 of the attachment arm 150. The recess 152 may be situated near a vertex 156 of the attachment arm 150. In addition, the recess 152 may be curved and have a lower radius of curvature than a portion of the attachment arm 150 not including the recess 152. If, for example, the apparatus 100 is attached to a ring of a pet collar via the attachment arm 150, the recess 152 may allow the apparatus 100 to be supported by the ring of the pet collar inside of the recess 152 in a centered manner, and may render the attachment arm 150 less apt to slide laterally over an inner circumference of the ring. The apparatus 100 may further include a detent arm 160. The detent arm 160 may simultaneously lock the attachment arm 150 and close a tag loop 170, or simultaneously unlock the attachment arm 150 and open the tag loop 170. The tag loop 170 may be opened, in order to allow a tag, such as a pet tag, to be slid onto or off of the tag loop, and closed again, in order to allow the tag to be retained by the tag loop 170. The tag loop 170 may have a fixed end 172 and a free end 174. The fixed end 172 may be rigidly connected to the body 110. In the example shown in FIG. 1, the fixed end 172 is rigidly connected to the rear plate 130. However, the fixed end may also be coupled, either directly or indirectly, to another part of the body 110, such as the front plate 120. The fixed end 172 of the tag loop 170 may be formed in one piece with the body 110, e.g., molded or extruded on, machined, etc. The fixed end 172 may also be adhesively bonded or press-fit to the body 110 or rigidly attached to the body 110 in another suitable manner. When the tag loop 170 is closed, it may form a second closed loop with the detent arm 160. It will be appreciated, that while the free end 174 of the tag loop 170 may contact the body 110 in the closed position, forming a closed loop, the free end 174 of the tag loop 170 alternatively need not contact the body 110, as long as the free end 174 comes close enough to reliably retain a tag.

Further with regard to FIG. 1, the example apparatus 100 may also include an actuator 180, which may be mechanically coupled, e.g., by being rigidly connected, to the detent arm 160, in order to allow a human finger, for example, to exert a force on the detent arm 160. The actuator 180 may be moved between an open position of the actuator 180 and a closed position of the actuator 180. While the actuator is shown in the example as a slideable button, alternative other forms of mechanical actuators may be used, e.g., a lever, a dial, a push button, etc. The apparatus 100 may further include a compressible spring 190 (see FIG. 2) that may exert a force on the detent arm 160. The front and rear plates 120, 130, the upper seating element 140, the attachment arm 150, the detent arm 160, the tag loop 170 and the actuator 180 may be made of metals such as aluminum, steel or any cast metals, or plastics such as PET, ABS, Delrin, Nylon or Polypro, or other suitable materials. The compressible spring 190 may be made of rubber, plastic, silicone or other suitable materials.

Figure 2:
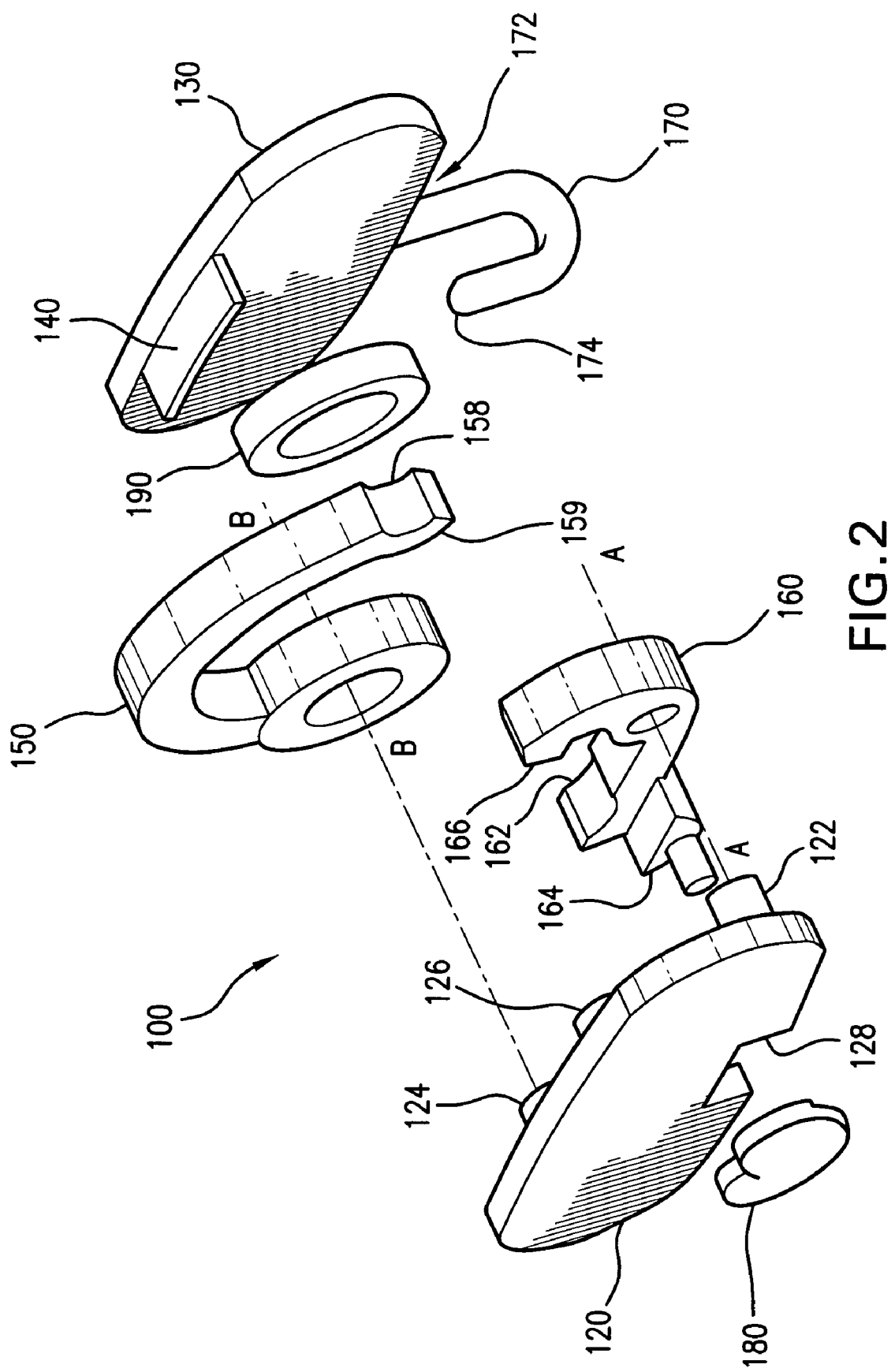
FIG. 2 is an exploded perspective view of the example tag attachment apparatus of FIG. 1, according to an example embodiment of the present invention.

FIG. 2 is an exploded perspective view of the example tag attachment apparatus of FIG. 1, according to an example embodiment of the present invention. FIG. 2 illustrates the interaction of the various parts of the apparatus 100. Parts identical to those in FIG. 1 are indicated by the same reference numerals. As can be seen from the figure, the detent arm 160, the attachment arm 150 and the compressible spring 190 may be disposed at least partially between the front and rear plates 120 and 130. The detent arm 160 may rotate on a detent arm bearing 122 about an axis A-A. The attachment arm 150 may rotate on an attachment arm bearing 124 about an axis B-B, which is approximately parallel to the axis A-A. In addition, the attachment arm 150 and the detent arm 160 may rotate in approximately the same plane. The compressible spring 190 may be supported between a lower seating recess 162 in the detent arm 160 and an upper seating element 140. The front plate 120 may include a retaining element 126 to aid in holding the compressible spring 190 in position during assembly of the apparatus 100. The compressible spring 190 may be prestressed and may exert a downward force on the detent arm 160 at the lower seating recess 162, thereby resisting rotation of the detent arm 160 about axis A-A. In the illustrated example, the compressible spring 190 is an annular spring that may have an outer diameter of approximately 0.375 in to 0.5 in or other suitable dimension. However, the compressible spring 190 may also be a coil spring, volute spring, cantilever spring, z-shaped or zigzag-shaped spring, or any other suitable spring. Additionally in the illustrated example, the upper seating element 140 is integrally formed on the upper portion of rear plate 130. However, alternatively, the upper seating element 140 may be situated on either of the front and rear plates 120, 130. The actuator 180 may be mechanically coupled, e.g., by being rigidly connected, to the detent arm 160 via an actuating arm 164 of the detent arm 160. As mentioned above with regard to FIG. 1, a force may be exerted on the detent arm 160 by, e.g., a human finger, via the actuator 180. This force is resisted by the compressible spring 190 supported between the lower seating recess 162 and the upper seating element 140. The actuator 180 may be moved between a closed position and an open position. In the closed position of the actuator 180, no force is exerted on the actuator 180, and the actuating arm 164 of the detent arm 160 rests against the free end 174 of the tag loop 170 to form the second closed loop with the tag loop 170. The actuator 180 may be moved into the open position by exerting an upward force on it. As the actuator 180 is moved into the open position, the detent arm 160, which is mechanically coupled to the actuator 180, rotates about axis A-A, and the actuating arm 164 rotates away from the free end 174 of the tag loop 170 in an approximately upward direction, thereby opening the tag loop 170 and forming a first open loop. A cut-out 128 may be provided in the front plate 120, in order to allow the actuating arm 164 to move upward. As mentioned above with regard to FIG. 1, the attachment arm 150 may assume a locked position and an unlocked position. When the attachment arm 150 is in the locked position, the actuator 180 is in the closed position, and an engagement protuberance 166 of the detent arm 160 engages with a C-shaped engagement recess 158 of the attachment arm 150 and locks the attachment arm 150 in place. If the actuator 180 is now moved into the open position, the engagement protuberance 166 of the detent arm 160 may disengage from the C-shaped engagement recess 158 of the attachment arm 150, thereby allowing the attachment arm 150 to be rotated about axis B-B into an unlocked position, e.g., in a direction, in which a portion of the attachment arm 150 including the C-shaped engagement recess 152 moves away from the detent arm 160 and the attachment arm 150 forms a second open loop. If the actuator 180 is now released, a downward force applied to the lower seating recess 162 by the compressible spring 190 causes the detent arm 160 to rotate back into its original position, in which the actuating arm 164 rests against the free end 174 of tag loop 170 and forms the second closed loop with tag loop 170. In order to now move the attachment arm 150 from the unlocked position to the locked position, the attachment arm 150 is rotated in a direction in which a portion of the attachment arm 150 including the c-shaped engagement recess 158 moves towards a portion of the detent arm 160 including the engagement protuberance 166. If the rotation of the attachment arm 150 is continued, a cam surface 159 of the attachment arm 150 makes contact with the engagement protuberance 166 and exerts a force on it, thereby causing the engagement protuberance 166 to slide over the cam surface 159 and causing the detent arm 160 to rotate, until the engagement protuberance 166 re-engages with the C-shaped engagement recess 158 and locks the attachment arm 150 in place.

Figure 3:
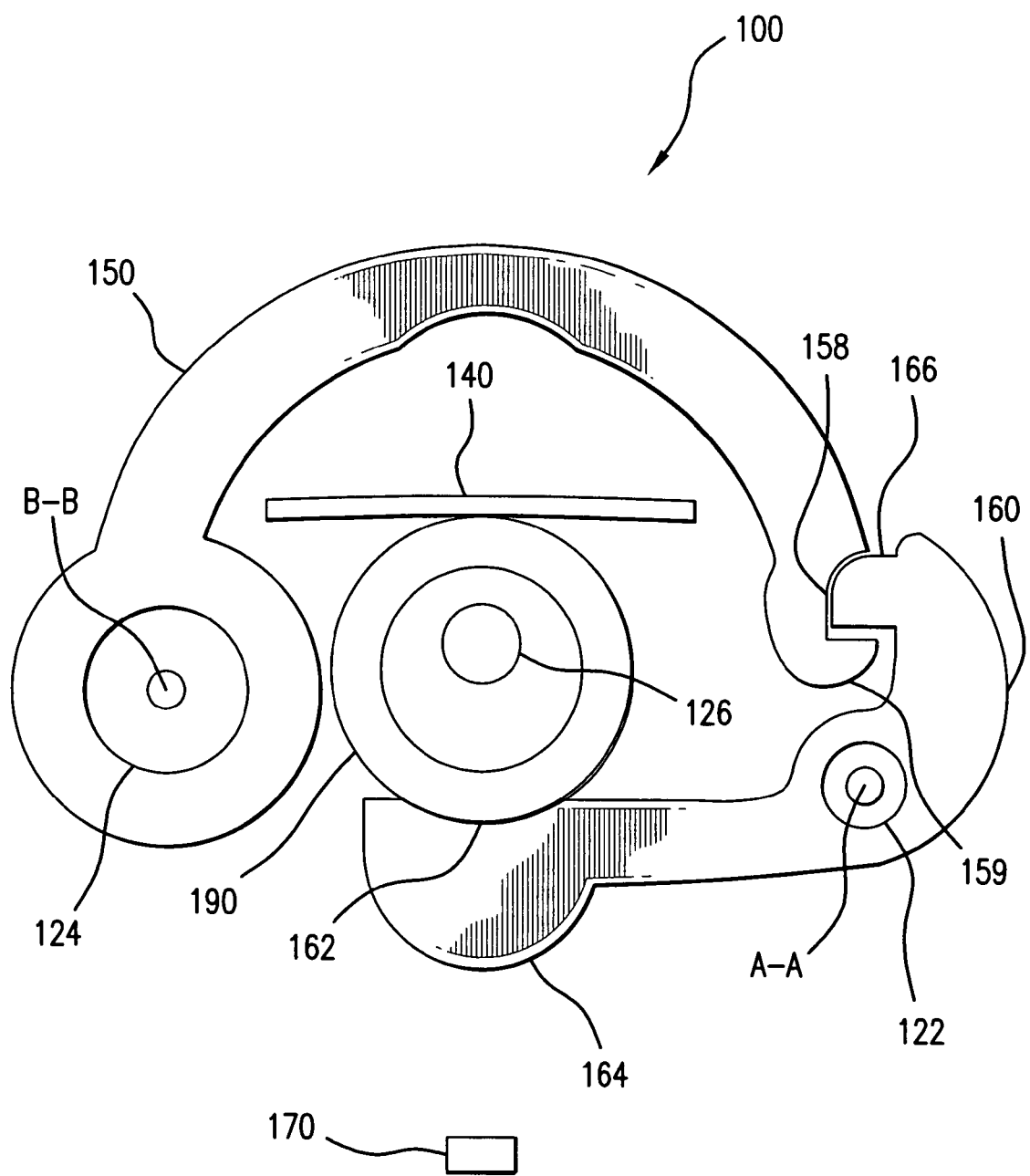
FIG. 3 is a mid-line cutaway view of the example tag attachment apparatus of FIG. 1, according to an example embodiment of the present invention.

FIG. 3 is a mid-line cutaway view of the example tag attachment apparatus of FIG. 1, according to an example embodiment of the present invention. In FIG. 3, the apparatus 100 is in a state in which the actuator 180 (not visible in this view) is in the closed position and the attachment arm 150 is in the locked position. In this view, the compression spring 190, prestressed between upper seating element 140 and lower seating recess 162, exerts a downward force on the actuating arm 164. As a result, the actuating arm 164 presses against the free end 174 of the tag loop 170 to form the second closed loop with the tag loop 170 (see FIG. 1), and the attachment arm 150 remains engaged with the detent arm 160 via the engagement protuberance 166 and the C-shaped engagement recess 159 to form the first closed loop. If an upward force is now applied to the actuating arm 164 via the actuator 180, e.g., if the actuator 180 is now moved into the open position, the detent arm 160 rotates about the detent arm bearing 122 in a direction, in which the portion of detent arm 160 including the actuating arm 164 compresses the compressible spring 190 and the portion of the detent arm 160 including engagement protuberance 166 moves away from the attachment arm 150 and disengages from it. The attachment arm 150 may now be rotated away from the engagement protuberance 166 into an unlocked position.

Figure 3A:
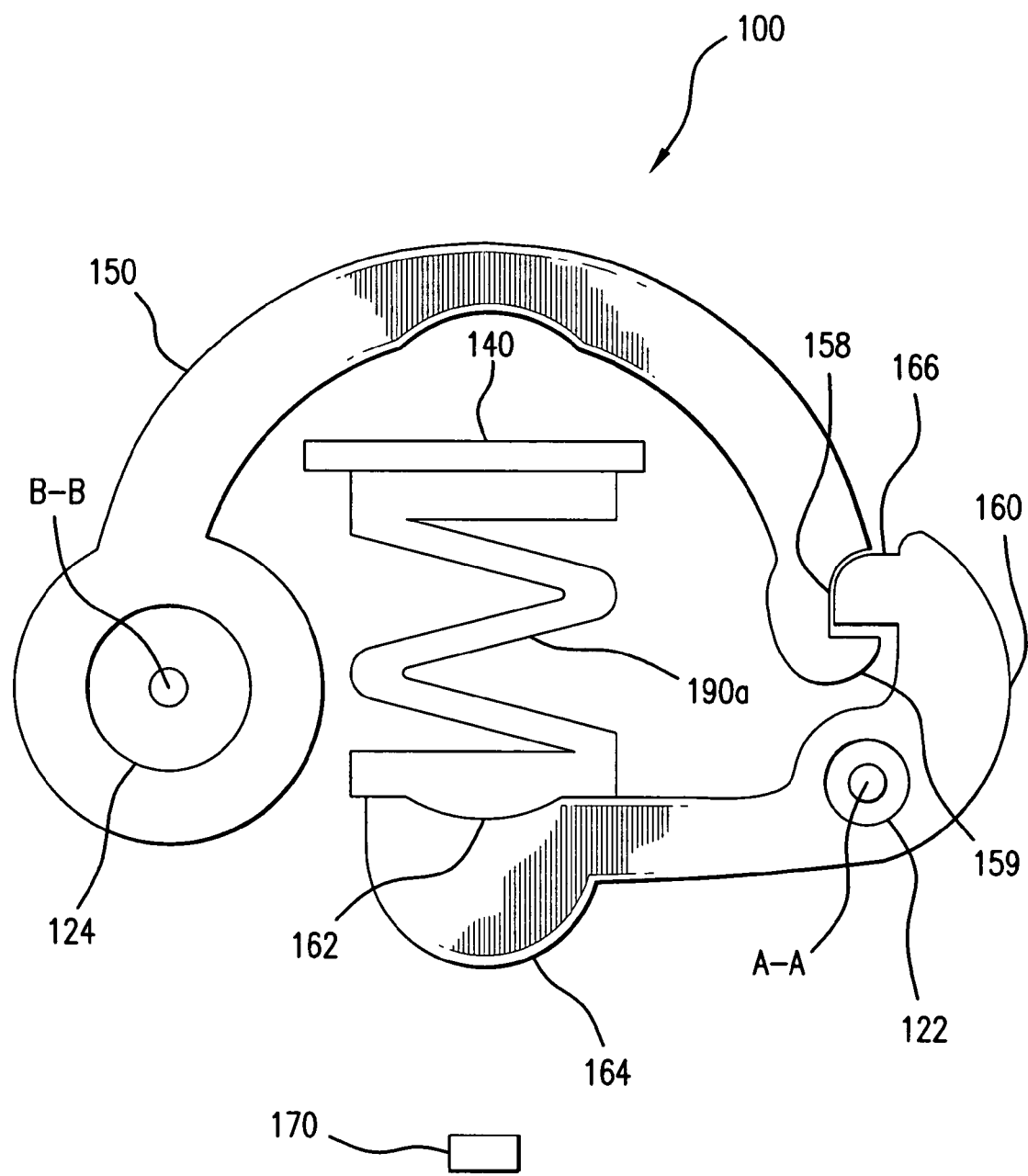
FIG. 3A is a mid-line cutaway view of a further example tag attachment apparatus, according to an example embodiment of the present invention.

FIG. 3A is a mid-line cutaway view of a further example tag attachment apparatus, according to an example embodiment of the present invention. The example tag apparatus shown in FIG. 3A is identical to that of FIG. 3, except that the annular compressible spring 190 is replaced by a z-shaped or zigzag-shaped compressible spring 190a and retaining element 126 is omitted.

Figure 4:
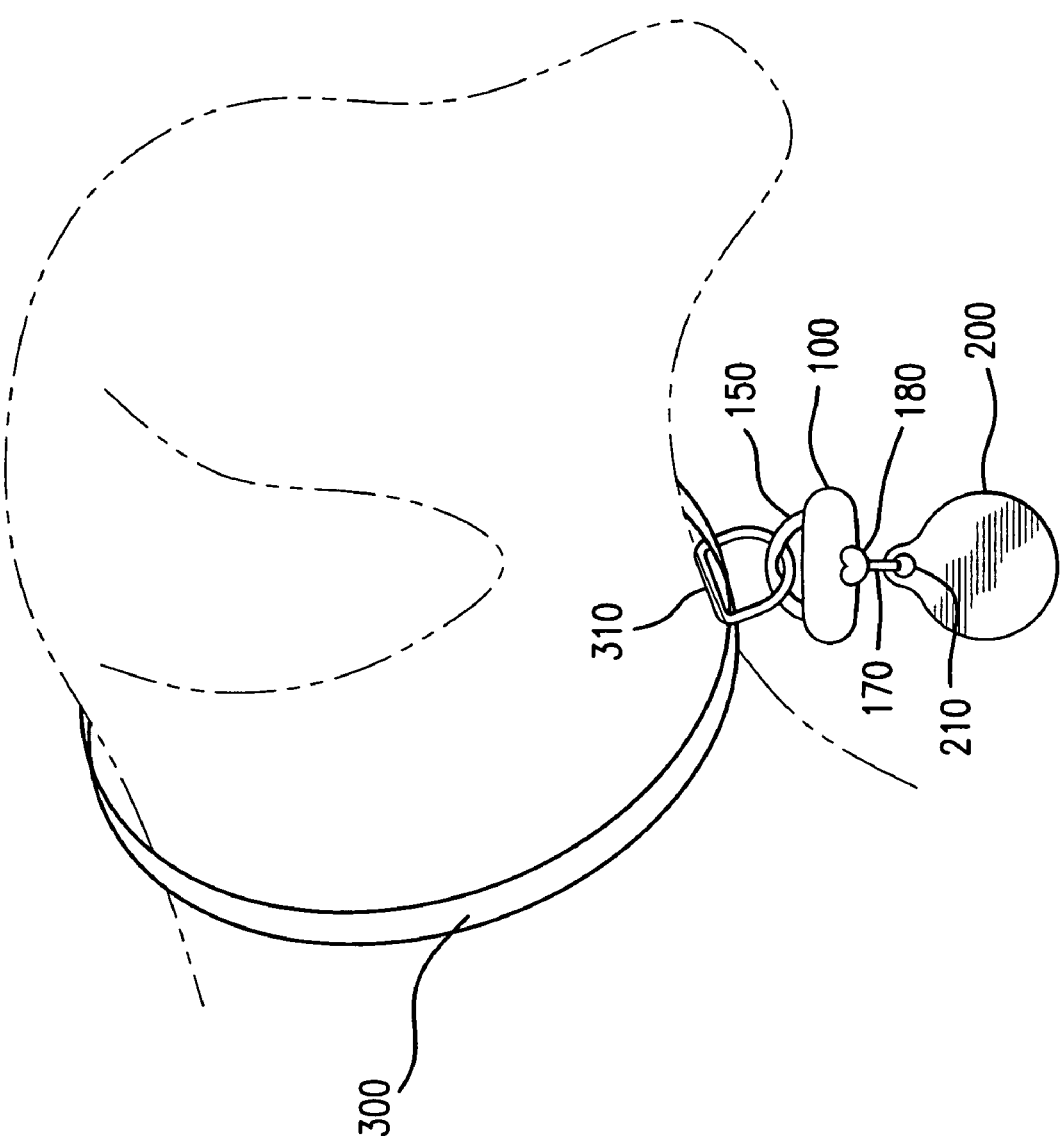
FIG. 4 is a schematic view of an example pet collar assembly, including the example tag attachment apparatus and a pet tag, according to an example embodiment of the present invention.

FIG. 4 is a schematic view of an example an pet collar assembly, including the example tag attachment apparatus and a pet tag, according to an example embodiment of the present invention. The assembly may include an apparatus 100 for attaching a tag to an object, a pet tag 200 and a pet collar 300. The tag may have an aperture 210, through which the tag loop 170 of the apparatus 100 is inserted when the tag loop 170 is opened. The apparatus 100 may be mechanically coupled to the pet collar 300 via the attachment arm 150 and a ring 310. The attachment arm 150 may be inserted into the ring 310 after the actuator 180 is moved into the open position and the attachment arm 150 is rotated into the unlocked position. The attachment arm 150 may then be moved into the locked position again.

It will be appreciated that the example tag apparatus, described herein, may also be employed in applications other than as a pet tag holder, e.g., to hold a luggage tag to a luggage item, to hold a removable identifier to a piece of equipment, as part of a key ring, etc.

The foregoing description discloses only exemplary embodiments of the invention. Modification of the above-disclosed apparatus which falls within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed is:

1. A pet tag holder, comprising:
   a pet collar attachment arm rotatable about a first axis, the pet collar attachment arm having a locked position and an unlocked position;
   a detent arm including an actuating arm and a lower seating recess, the detent arm being rotatable about a second axis approximately parallel to the first axis and engaging with the pet collar attachment arm when the pet collar attachment arm is in the locked position;
   an actuator mechanically coupled to the actuating arm, the actuator movable between an open position and a closed position;
   a front plate having a retention element;
   a rear plate having an upper seating element, the pet collar attachment arm forming a first closed loop with the front and rear plates in the locked position;
   a tag loop rigidly coupled to the rear plate at one end of the tag loop and forming a second closed loop with the detent arm when the actuator is in the closed position; and
   a compressible spring supported in a prestressed manner between the upper seating element of the rear plate and the lower seating recess of the detent arm;
   wherein moving the actuator from the closed position to the open position causes the detent arm to disengage from and unlock the collar attachment arm and simultaneously open the tag loop.

2. An apparatus for attaching a tag to an object, comprising:
   a body;
   an attachment arm, the attachment arm having a locked position and an unlocked position, and the attachment arm lockably closing to form a first closed loop with the body when the attachment arm is in the locked position;
   a tag loop mechanically coupled to the body; and
   a detent arm mechanically engaged with the attachment arm in the locked position of the attachment arm and retaining the attachment arm in the locked position, the detent arm configured so that an application of a force to the detent arm simultaneously unlocks the attachment arm and opens the tag loop.

3. The apparatus of claim 2, wherein the body comprises a front plate and a rear plate; the attachment arm and the detent arm being at least partially situated between the front plate and the rear plate.

4. The apparatus of claim 3, further comprising an attachment arm bearing and a detent arm bearing, the attachment arm being rotatable on the attachment arm bearing about a first axis, and the detent arm being rotatable on the detent arm bearing about a second axis approximately parallel to the first axis.

5. The apparatus of claim 4, wherein the attachment arm and the detent arm are rotatable in approximately the same plane.

6. The apparatus of claim 3, wherein the detent arm includes an actuating arm and a lower seating recess.

7. The apparatus of claim 4, further comprising a compressible spring mechanically connected to the detent arm in a prestressed manner and resisting rotation of the detent arm about the second axis.

8. The apparatus of claim 7, wherein the compressible spring is an annular spring.

9. The apparatus of claim 7, wherein the compressible spring is one of a z-shaped spring and a zig-zag shaped spring.

10. The apparatus of claim 7, wherein the detent arm, the attachment arm and the compressible spring are situated at least partially between the front plate and the rear plate.

11. The apparatus of claim 6, further comprising an actuator mechanically coupled to the actuating arm and having an open position and a closed position.

12. The apparatus of claim 11, wherein the tag loop is rigidly coupled to the rear plate at one end of the tag loop and forms a second closed loop with the detent arm when the actuator is in the closed position.

13. The apparatus of claim 11, wherein the attachment arm includes a c-shaped engagement recess, and the detent arm includes an engagement protuberance.

14. The apparatus of claim 13, wherein the engagement protuberance engages with the c-shaped engagement recess when the actuator is in the closed position and the attachment arm is in the locked position.

15. The apparatus of claim 14, wherein when the actuator is in the closed position, the compressible spring exerts a force on the detent arm to retain the detent arm in the closed position of the actuator.

16. The apparatus of claim 15, wherein when the actuator is moved into the open position, a first portion of the detent arm including the engagement protuberance is rotated in a direction away from the attachment arm, the engagement protuberance disengages from the c-shaped engagement recess of the attachment arm, and a second portion of the detent arm including the actuating arm is rotated away from a second end of the tag loop to form a first open loop.

17. The apparatus of claim 16, wherein when the actuator is moved into the open position and the attachment arm is in the locked position, a portion of the attachment arm including the c-shaped engagement recess may be rotated in a direction away from the detent arm into an unlocked position of the attachment arm to form a second open loop.

18. The apparatus of claim 17, wherein the portion of the attachment arm including the c-shaped engagement recess includes a cam surface.

19. The apparatus of claim 18, wherein when the actuator is in the closed position and the attachment arm is rotated from the unlocked position to the locked position, the cam surface exerts a force on the engagement protuberance and causes the detent arm to rotate until the engagement protuberance engages with the c-shaped engagement recess.

20. The apparatus of claim 19, wherein the attachment arm has a curved recess on an underside of the attachment arm, near a vertex of the attachment arm, the curved recess having a radius of curvature less than a radius of curvature of a portion of the attachment arm not including the recess.

21. An assembly, comprising:
    a pet tag having an aperture;
    the apparatus of claim 2, the tag loop being inserted through the aperture; and
    a pet collar mechanically coupled to the apparatus by the attachment arm.

22. The assembly of claim 21, wherein the mechanical coupling of the pet collar to the apparatus is implemented via a ring through which the attachment arm is inserted, the pet collar passing through the ring.

23. An apparatus for attaching a tag to an object, comprising:
a body;
an attachment arm, the attachment arm having a locked position and an unlocked position, and the attachment arm lockably closing to form a first closed loop with the body when the attachment arm is in the locked position;
a tag loop mechanically coupled to the body;
a detent arm mechanically engaged with the attachment arm in the locked position of the attachment arm, the detent arm configured so that an application of a force to the detent arm simultaneously unlocks the attachment arm and opens the tag loop, the detent arm including an actuating arm and a lower seating recess;
an attachment arm bearing and a detent arm bearing, the attachment arm being rotatable on the attachment arm bearing about a first axis, and the detent arm being rotatable on the detent arm bearing about a second axis approximately parallel to the first axis;
a compressible spring mechanically connected to the detent arm in a prestressed manner and resisting rotation of the detent arm about the second axis; and
an actuator mechanically coupled to the actuating arm and having an open position and a closed position
wherein
the body comprises a front plate and a rear plate; the attachment arm and the detent arm being situated at least partially between the front plate and the rear plate; the attachment arm and the detent arm are rotatable in approximately the same plane;
the compressible spring is an annular spring, a z-shaped spring, or a zigzag-shaped spring; the detent arm, the attachment arm and the compressible spring are situated at least partially between the front plate and the rear plate;
the tag loop is rigidly coupled to the rear plate at one end of the tag loop and forms a second closed loop with the detent arm when the actuator is in the closed position; the attachment arm includes a c-shaped engagement recess, and the detent arm includes an engagement protuberance;
the engagement protuberance engages with the c-shaped engagement recess when the actuator is in the closed position and the attachment arm is in the locked position; when the actuator is in the closed position, the compressible spring exerts a force on the detent arm to retain the detent arm in the closed position of the actuator; when the actuator is moved into the open position, a first portion of the detent arm including the engagement protuberance is rotated in a direction away from the attachment arm, the engagement protuberance disengages from the c-shaped engagement recess of the attachment arm, and, a second portion of the detent arm including the actuating arm is rotated away from a second end of the tag loop to form a first open loop;
when the actuator is moved into the open position and the attachment arm is in the locked position, a portion of the attachment arm including the c-shaped engagement recess may be rotated in a direction away from the detent arm into an unlocked position of the attachment arm to form a second open loop;
the portion of the attachment arm including the c-shaped engagement recess includes a cam surface; and when the actuator is in the closed position and the attachment arm is rotated from the unlocked position to the locked position, the cam surface exerts a force on the engagement protuberance and causes the detent arm to rotate until the engagement protuberance engages with the c-shaped engagement recess.

24. An apparatus for attaching a tag to an object, comprising:
a body;
a means for attaching the body to the object, the means for attaching the body to the object having a locked position and an unlocked position, and the means for attaching the body to the object lockably closing to form a first closed loop with the body when the means for attaching the body to the object is in the locked position;
a means for attaching the tag to the body; and
a means for locking and unlocking the means for attaching the body to the object and for opening and closing the means for attaching the tag to the body; the means for locking and unlocking the means for attaching the body to the object and for opening and closing the means for attaching the tag to the body being mechanically engaged with the means for attaching the body to the object in the locked position of the means for attaching the body to the object so that the means for locking retains the means for attaching in the locked position;
the means for locking and unlocking the means for attaching the body to the object and for opening and closing the means for attaching the tag to the body being configured so that an application of force to the means for locking and unlocking the means for attaching the body to the object and for opening and closing the means for attaching the tag to the body simultaneously unlocks the means for attaching the body to the object and opens the means for attaching the tag to the body.

* * * * *